March 7, 1967 U. TSAO 3,308,212
PROCESS AND APPARATUS FOR PREPARING UREA PRILLS
Filed April 4, 1963
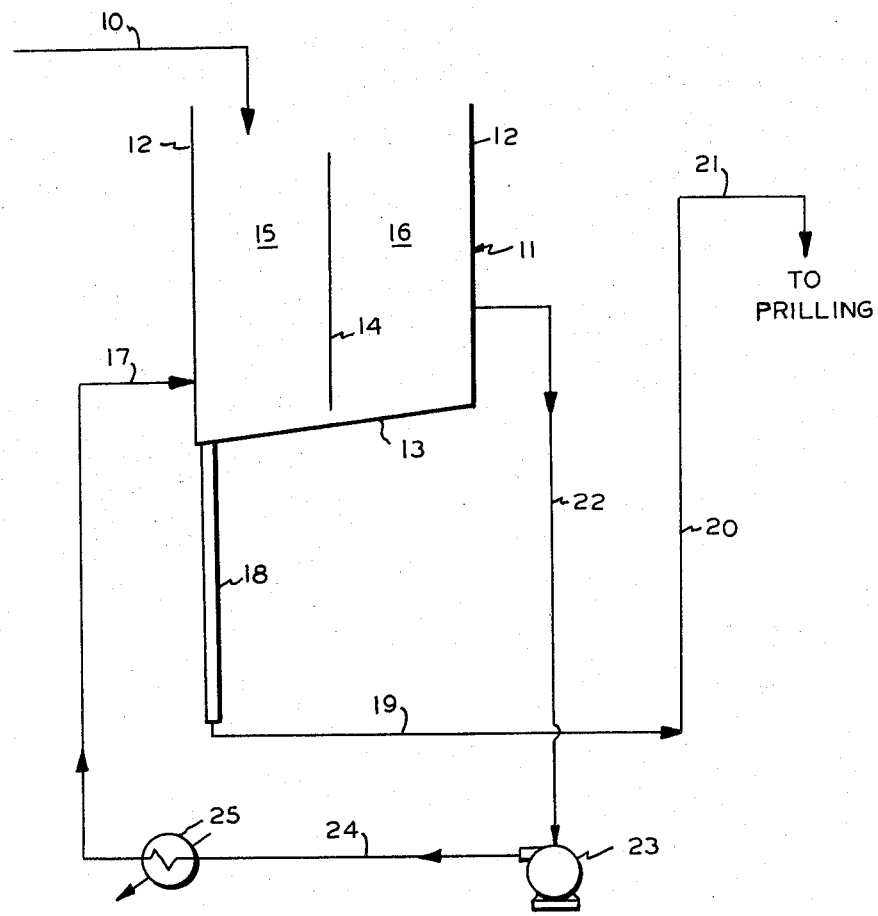
INVENTOR
UTAH TSAO
BY Ross L. Foertmeyer
ATTORNEY United States Patent Office 3,308,212
Patented Mar. 7, 1967

3,308,212
PROCESS AND APPARATUS FOR PREPARING UREA PRILLS
Utah Tsao, Jersey City, N.J., assignor to The Lummus Company, New York, N.Y., a corporation of Delaware
Filed Apr. 4, 1963, Ser. No. 270,723
12 Claims. (Cl. 264—13)

This invention relates to the preparation of solid urea and, more particularly, this invention relates to an improved method for preparing urea prills having a biuret content of less than 0.5%.

It is well known that when ammonia and carbon dioxide, or compounds thereof, such as ammonium carbonate, bicarbonate, carbamate, and the like are subjected to high temperatures in a closed system, high pressures are generated and urea is formed. For example, urea synthesis has been conducted at pressures from about 200 to 350 atmospheres in an autoclave maintained at temperatures of 160° C. to 220° C. During the synthesis reaction, the ammonia and carbon dioxide primarily combine exothermically to form ammonium carbamate, which, at the temperature of the reaction, is slowly transformed into urea and water. The resulting reaction effluent mixture contains in addition to urea and water, uncombined residues of the starting materials and ammonium carbonate, bicarbonate, and carbamate. The water formed during dehydration of the ammonium carbamate is condensed owing to the prevailing pressure and thereby forms an absorbent for the urea.

It has been the usual procedure that the aqueous autoclave effluent is next treated whereby unreacted ammonia and carbon dioxide are recovered and the water is vaporized and removed so as to obtain a relatively pure solid urea product. Such procedures of complete evaporation have in the past been economically unsatisfactory because the resultant hard crystalline mass has to be crushed into solids of usable shape and size. Further, the evaporation of water from a degassed urea solution to obtain a highly concentrated solid form of urea or urea melt has had the result that the impurities of the solution remain in the product form of urea. Such impurities are generally introduced into the urea synthesis and synthesis solution processing systems in two ways. The reactant feed gases (ammonia and carbon dioxide) form a first source of impurities since these gases are never in a 100% pure state. The second major source of impurities is the synthesis and synthesis melt treating plant itself. The pressure vessels, piping, pumps, compressors and valves provide a constant source of contaminants, including oil, grease, metals and metal salts.

Solid product urea is normally recovered in the prilled or crystalline form. According to known procedures, urea in the prilled form normally contains at least 0.8% biuret as a result of the duration of time, the urea melt is maintained at a temperature above the melting point of urea prior to being introduced into the prilling tower. Crystalline urea, on the other hand, has been prepared having a biuret content of less than 0.2%. Crystalline urea, however, is not as desirable a form of solid urea as are the prills.

It is an object of my invention to provide an improved process and apparatus for preparing urea prills having a biuret content of less than 0.5%.

A further object of my invention is to provide an improved process and apparatus for forming urea prills having a biuret content of less than 0.5% utilizing fluidized-suspension techniques.

A still further object of my invention is to provide an improved process for preparing urea prills having a biuret content of less than 0.5% utilizing a mineral oil or other inert liquid as the fluidizing media.

Still another object of my invention is to provide a process for preparing urea prills from urea crystals wherein the increase in biuret content is less than 0.1%.

Other processes have been developed involving the reaction of ammonia and carbon dioxide to form urea where the reaction is effected in an inert diluent medium, such as in viscous petroleum hydrocarbons or mineral oils or methanol. My invention does not relate to the preparation of urea in an inert medium or to the concentration of a urea solution, but relates to a method of preparing urea prills of low biuret content from crystalline urea.

In accordance with my invention, urea crystals containing less than 0.4% biuret are introduced into a rising stream of mineral oil or other inert liquid which is immiscible with melted urea heated to a temperature above the melting point of urea and form a fluidized suspension of the crystals in the mineral oil. The large surface of contact between the urea crystals and the mineral oil effects a rapid transfer of heat from the oil to the crystals. Upon melting, droplets of urea form and sink to the bottom of the vessel as a result of the streamline shape of such droplets. Large droplets of urea may be formed by smaller droplets coalescing with each other and sink to the bottom of the vessel at a much faster rate. The temperature of the oil introduced into the vessel is maintained so that the temperature at which the oil leaves the vessel is very close to the melting point of urea. The urea melt flows into a vertically positioned conduit mounted below the vessel. The height of the conduit is at least one foot and is sufficient to provide an interface within the conduit between the molten urea and mineral oil to allow the mineral oil to separate from the urea melt. The diameter of the conduit is large enough to minimize entrainment of the mineral oil in the urea melt which is subsequently passed to a prilling tower. The interface level within the conduit is maintained at a height determined by the height of the discharge point of an outlet conduit to the prilling tower and the static head of the mineral oil in the vessel. In this manner, the urea melt can be passed to the prilling tower without the aid of mechanical means.

The invention is further described by reference to the accompanying drawing which illustrates a preferred embodiment of my invention for preparing urea prills having a biuret content of less than 0.5%.

Referring to the drawing, crystalline urea in line 10 is introduced into a vessel, generally indicated as 11, and comprised of side walls 12 and sloped bottom 13. A partition 14 is centrally located within the vessel 11 forming an upflowing zone 15 and downflowing zone 16. Mineral oil or other inert liquid which is immiscible with melted urea is introduced into the tank 11 through line 17 and forms essentially a fluidized suspension of urea crystals in the zone 15. The mineral oil or other inert liquid is heated to a temperature sufficient to melt the urea crystals introduced into the vessel 11 through line 10, preferably a temperature of from about 275° F. to about 285° F. The quantity of mineral oil introduced into the vessel 11 is maintained as large as practical to minimize excess heating of the oil supplying the heat of fusion to the urea crystals. Further, the velocity of the oil through the zone 15 of vessel 11 is determined by the size of the urea crystals and is regulated so that the crystals introduced into the vessel 11 through line 10 are melted with the resulting droplets sinking to the bottom of vessel 11 in less than 30 seconds. The velocity of the mineral oil passing through the zone 15 of the vessel 11 may be regulated by the vertical position of the partition 14 in the vessel 11 or by the rate at which the oil is introduced into the zone 15. A small portion of the urea droplets may be carried over into zone 16 of the vessel 11 since the urea crystals introduced into the vessel 11 will contain a certain amount of fines. In this event, the droplets sink to the bottom of the zone 16 from which the molten urea is caused to pass by gravity through the opening between the lower portion of the partition 14 and the bottom of the vessel 11. Thus, the downflow zone 16 is provided to eliminate the possibility of passing urea droplets through the mineral oil heating cycle.

The bottom 13 is vessel 11 is sloped to that the urea melt passes to the lower portion of the vessel 11. At the lower portion of the tank 11, there is provided a bottom outlet pipe, generally indicated as 18. The urea melt enters the outlet pipe 18 and is withdrawn through the pipe 18 and passed by steamjacketed lines 19, 20 and 21 to a prilling tower (not shown). The diameter of the outlet pipe 18 is relatively large so as to minimize trapping or entrainment of any mineral oil droplets in the urea melt collected in the outlet pipe 18. The height of the pipe 18 is sufficient to maintain an interface level in the pipe 18 to allow the mineral oil to separate from the urea melt. The interface level between the urea melt and mineral oil is maintained in the pipe 18 and is determined by the height of line 20 and the head of the mineral oil in the vessel.

Mineral oil is withdrawn from the vessel 11 through line 22 by pump 23 and is passed through line 24 to heat exchanger 25. The mineral oil is heated in heat exchanger 25 and reintroduced into tank 11 through line 17. As hereinbefore mentioned, the inlet temperature of the mineral oil is maintained at a temperature such that the mineral oil withdrawn from the vessel 11 is at a temperature very close to the melting point of urea, after supplying the heat of fusion to the urea crystals.

A specific example of a preferred mode of operation is set forth below and is for purposes of illustration only and is not to be considered as limiting the invention in any way.

2,000 pounds per hour of urea crystals having a 0.2% biuret content and of about 50 mesh are introduced into the upflowing zone 15 of the vessel 11. 95 gallons per minute of a mineral oil having a density of 45.5 pounds per cubic foot and heated to a temperature of 280° F. are introduced into the zone 15 of the vessel 11 to supply the heat of fusion to the urea crystals. Molten urea, at a temperature of about 280° F., is withdrawn through pipe 18 and passed through lines 19, 20 and 21 to a prilling tower. A throughput time of 57 seconds is effected between the time urea crystals were introduced into the vessel 11 and prills subsequently formed in the prilling tower (not shown). 2,000 pounds per hour of urea prills containing 0.3% biuret are withdrawn from the prilling tower. Thus, there was a net increase of 0.1% biuret.

While I have illustrated a preferred embodiment of my invention, it is apparent that many modifications and variations thereto may be made by one skilled in the art. Accordingly, the invention is not to be construed with any limitations other than those recited in the appended claims.

I claim:

1. In a method for preparing prilled urea, an improvement comprising,
    introducing crystalline urea having a biuret content of less than 0.2% into a melting zone;
    introducing an inert liquid that is immiscible with melted urea into said zone, said liquid being at a temperature which is above the melting point of urea;
    passing said inert liquid in countercurrent relation to said urea crystals whereby said urea crystals are melted and the thus formed droplets of urea melt pass through said body of inert liquid; and
    withdrawing urea melt from said zone and passing said urea melt to a prilling zone to form prilled urea having a biuret content of less than 0.5%.

2. A method for preparing prilled urea as defined in claim 1 wherein the inert liquid is heated to a temperature of from about 275° F. to about 285° F.

3. In a method for preparing prilled urea, an improvement comprising,
    introducing crystalline urea having a biuret content of less than 0.2% into a melting zone;
    forming in said zone a fluidized suspension of said crystals in an upwardly flowing stream of an inert liquid heated to a temperature above the melting point of urea, said liquid being immiscible with melted urea;
    withdrawing urea melt from said zone; and
    passing said urea melt to a prilling zone to form prilled urea having a biruet content of less than 0.5%.

4. A method for preparing prilled urea as defined in claim 3 wherein the inert liquid is heated to a temperature of from about 275° F. to about 285° F.

5. In a process for preparing urea prills, an improvement wherein the increase in biuret content is less than 0.1% comprising,
    introducing crystalline urea into a melting zone;
    forming in said zone a fluidized suspension of said crystals in an upwardly flowing stream of an inert liquid heated to a temperature above the melting point of urea, said liquid being immiscible with melted urea;
    controlling the quantity of inert liquid passing through said zone whereby said urea crystals melt and the residence time of urea through said zone is less than 30 seconds; and
    withdrawing urea melt from said zone and passing said urea melt to a prilling zone to form said urea prills.

6. A process for preparing urea prills from urea crystals as defined in claim 5 wherein the inert liquid is heated to a temperature of about 275° F. to about 285° F.

7. In a method for preparing prilled urea, an improvement comprising,
    introducing crystalline urea having a biuret content of less than 0.2% into a melting zone;
    introducing an inert liquid that is immiscible with melted urea into said zone, said liquid being at a temperature above the melting point of urea;
    passing said inert liquid in countercurrent relation to said urea crystals whereby said urea crystals are melted and the thus formed droplets of urea melt pass through said body of inert liquid;
    passing said inert liquid downwardly through a recovery zone wherein additional droplets of urea are collected;
    passing the urea melt collected in said recovery zone to said melting zone;
    withdrawing inert liquid from said recovery zone; and
    withdrawing urea melt from said zone and passing said urea melt to a prilling zone to form prilled urea having a biuret content of less than 0.5%.

8. In a method for preparing prilled urea, an improvement comprising,
    introducing crystalline urea having a biuret content of less than 0.2% into a melting zone;
    introducing an inert liquid that is immiscible with melted urea into said zone, said liquid being at a temperature above the melting point of urea;
    passing said inert liquid in countercurrent relation to said urea crystals whereby said urea crystals are melted and the thus formed droplets of urea melt pass through said body of inert liquid;
    passing said inert liquid downwardly through a recovery zone wherein additional droplets of urea are collected;
    passing the urea melt collected in said recovery zone to said melting zone; and
    withdrawing urea melt from said melting zone and passing said urea melt to a prilling zone to form urea prills.

9. In a method for preparing prilled urea, an improvement comprising,
introducing crystalline urea having a biuret content of less than 0.2% into a melting zone;
introducing an inert liquid that is immiscible with melted urea into said zone, said liquid being at a temperature above the melting point of urea;
passing said inert liquid in countercurrent relation to said urea crystals whereby said urea crystals are melted and the thus formed droplets of urea melt pass through said body of inert liquid;
passing the urea melt into a withdrawal zone of sufficient height and cross-sectional area to provide an interface between the inert liquid and urea melt to allow the urea melt to separate from said inert liquid whereby entrainment of the inert liquid is minimized; and
withdrawing urea melt from said zone and passing said urea melt to a prilling zone to form prilled urea having a biuret content of less than 0.5%.

10. A process as defined in claim 9 wherein the urea melt is passed to the prilling tower without mechanical means.

11. An apparatus used in preparing urea for prilling which comprises,
a vessel including side walls and a slope bottom;
partition means positioned within said vessel defining a melting zone and a withdrawal zone, said melting zone and withdrawal zone being in liquid communication near the bottom of said vessel;
means for introducing crystalline urea into the melting zone of said vessel;
means for introducing an inert liquid into said melting zone of said vessel in countercurrent flow to said crystals;
a conduit mounted on said vessel near the bottom thereof whereby the urea melt is passed by gravity into said conduit;
means for withdrawing said inert liquid from said withdrawal zone; and
means for heating and reintroducing said inert liquid into said melting zone of said vessel.

12. An apparatus as defined in claim 11 further comprising conduit means for withdrawing the urea melt from the conduit mounted on said vessel, the height of said conduit means being determined by the head of urea melt in the conduit, and the head of said inert liquid in said vessel.

References Cited by the Examiner
UNITED STATES PATENTS 3,025,571 3/1962 Beecher et al. _____ 264—13
3,151,677 10/1964 Thompson et al. _____ 165—109

ROBERT E. WHITE, *Primary Examiner.*

J. R. HALL, *Assistant Examiner.*